United States Patent
Bouloy et al.

(10) Patent No.: US 8,032,503 B2
(45) Date of Patent: Oct. 4, 2011

(54) DEFERRED MAINTENANCE OF SPARSE JOIN INDEXES

(75) Inventors: Carlos Bouloy, San Diego, CA (US); Grace Au, Rancho Palos Verdes, CA (US); Hong Gui, Middleton, WI (US)

(73) Assignee: Teradata US, Inc., Dayton, OH (US)

( * ) Notice: Subject to any disclaimer, the term of this patent is extended or adjusted under 35 U.S.C. 154(b) by 500 days.

(21) Appl. No.: 12/186,217

(22) Filed: Aug. 5, 2008

(65) Prior Publication Data
US 2010/0036886 A1    Feb. 11, 2010

(51) Int. Cl.
*G06F 17/30* (2006.01)
(52) U.S. Cl. .......................... 707/696; 707/741
(58) Field of Classification Search .............. 707/639, 707/696, 695, 713–715, 741
See application file for complete search history.

(56) References Cited

U.S. PATENT DOCUMENTS

| | | | |
|---|---|---|---|
| 5,758,145 A | 5/1998 | Bhargava et al. | |
| 5,983,215 A * | 11/1999 | Ross et al. | 707/714 |
| 6,122,626 A * | 9/2000 | Brandsma | 1/1 |
| 6,345,272 B1 | 2/2002 | Witkowski et al. | |
| 6,347,253 B1 | 2/2002 | Fujita et al. | |
| 6,470,331 B1 * | 10/2002 | Chen et al. | 707/718 |
| 6,505,188 B1 * | 1/2003 | Ghazal et al. | 707/714 |
| 6,505,189 B1 | 1/2003 | On Au et al. | |
| 6,546,402 B1 * | 4/2003 | Beyer et al. | 707/625 |
| 6,618,720 B1 | 9/2003 | On Au et al. | |
| 6,643,636 B1 | 11/2003 | Au et al. | |
| 6,732,096 B1 | 5/2004 | Au | |
| 6,820,095 B1 | 11/2004 | Yeung et al. | |
| 6,952,692 B1 * | 10/2005 | Bhattiprolu et al. | 707/704 |
| 6,959,313 B2 * | 10/2005 | Kapoor et al. | 707/649 |
| 7,092,951 B1 * | 8/2006 | Luo et al. | 1/1 |

OTHER PUBLICATIONS

How to use Oracle9i bitmap join indexes. Nov 12, 2002—Donald Burleson. http://www.dba-oracle.com/ar_builder_bitmap_join_idx.htm.*
Blakeley, J.A.; Martin, N.L.; , "Join index, materialized view, and hybrid-hash join: a performance analysis," Data Engineering, 1990. Proceedings. Sixth International Conference on , vol., No., pp. 256-263, Feb. 5-9, 1990 doi: 10.1109/ICDE.1990.113476.*
Patrick Valduriez, Join indices, ACM Transactions on Database Systems (TODS), v.12 n.2, p. 218-246, Jun. 1987.*
Rotem, D.; , "Spatial join indices," Data Engineering, 1991. Proceedings. Seventh International Conference on , vol., No., pp. 500-509, Apr. 8-12, 1991 doi: 10.1109/ICDE.1991.131499 URL: http://ieeexplore.ieee.org/stamp/stamp.jsp?tp=&arnumber=131499&isnumber=3639.*
"U.S. Appl. No. 12/186,173, Non Final Office Action mailed Dec. 8, 2010", 19 pgs.
"U.S. Appl. No. 12/186,173, Response filed Mar. 8, 2011 to Non Final Office Action mailed Dec. 8, 2010", 9 pgs.

* cited by examiner

*Primary Examiner* — Robert Timblin
(74) *Attorney, Agent, or Firm* — Schwegman, Lundberg & Woessner (57) ABSTRACT

A system and method include defining a snapshot join index using a sparse condition in a join index definition. A new sparse condition of the snapshot join index is compared with an old sparse condition. Rows in a base table are identified as a function of the comparing, and the join index table is updated using the identified rows.

21 Claims, 4 Drawing Sheets

DEFERRED MAINTENANCE OF SPARSE JOIN INDEXES

RELATED APPLICATIONS

This application is related to the following application filed on the same date herewith: Query Processing Using Horizontal Partial Covering Join Index 12/186,173.

BACKGROUND

In an active data warehouse (ADW), data are fed into base tables in near real time. A workload on the ADW is usually a mix of both long running strategic queries and short tactic queries, which are run against the same set of tables. Join indexes, especially aggregate join indexes, can improve the performance of strategic queries significantly by precalculating the joins and aggregations. However, the frequent update to the base table and the existence of join indexes in such an environment may bring a big maintenance overhead.

There are two approaches to maintain join indexes in a database management system (DBMS). In direct maintenance, a join index table is updated in the same transaction that updates the base table. In deferred maintenance, the join index table is updated at a different time from the update to the base table. Each approach has its own pros and cons. Direct maintenance guarantees the data freshness in the join index but the overhead of maintaining the join index in real time may be a performance concern. Deferred maintenance overcomes the performance obstacle by delaying the join index update but queries may return inconsistent results due to the synchronization problem between the base table and join index.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or methods described herein may be implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A method of maintaining a join index emulates the performance of the deferred maintenance approach in a database management system (DBMS) while still maintaining accuracy in terms of query results. The maintenance method provides users control of both when to maintain the join index and to what extent the users would like to bring the join index up-to-date. In one embodiment, an underlying method to provide deferred maintenance is designed in such a way that an incremental part of the join index is calculated and merge deleted and merged into the join index table efficiently.

It is possible that the join index maintained in this way may not contain all the rows required in a query. By using a horizontal partial covering method, a query optimizer may still use the join index, and also be able to fetch the missing rows from the base table to give the complete answer to the query. The combination of these two methods may achieve good performance both in data loading and query processing. The join index may be maintained with a low cost in a short batch window.

A typical hardware and software environment is first described, followed by description of a horizontal partial covering method for fetching missing rows. Join index maintenance is then described.

Environment

Figure 1:
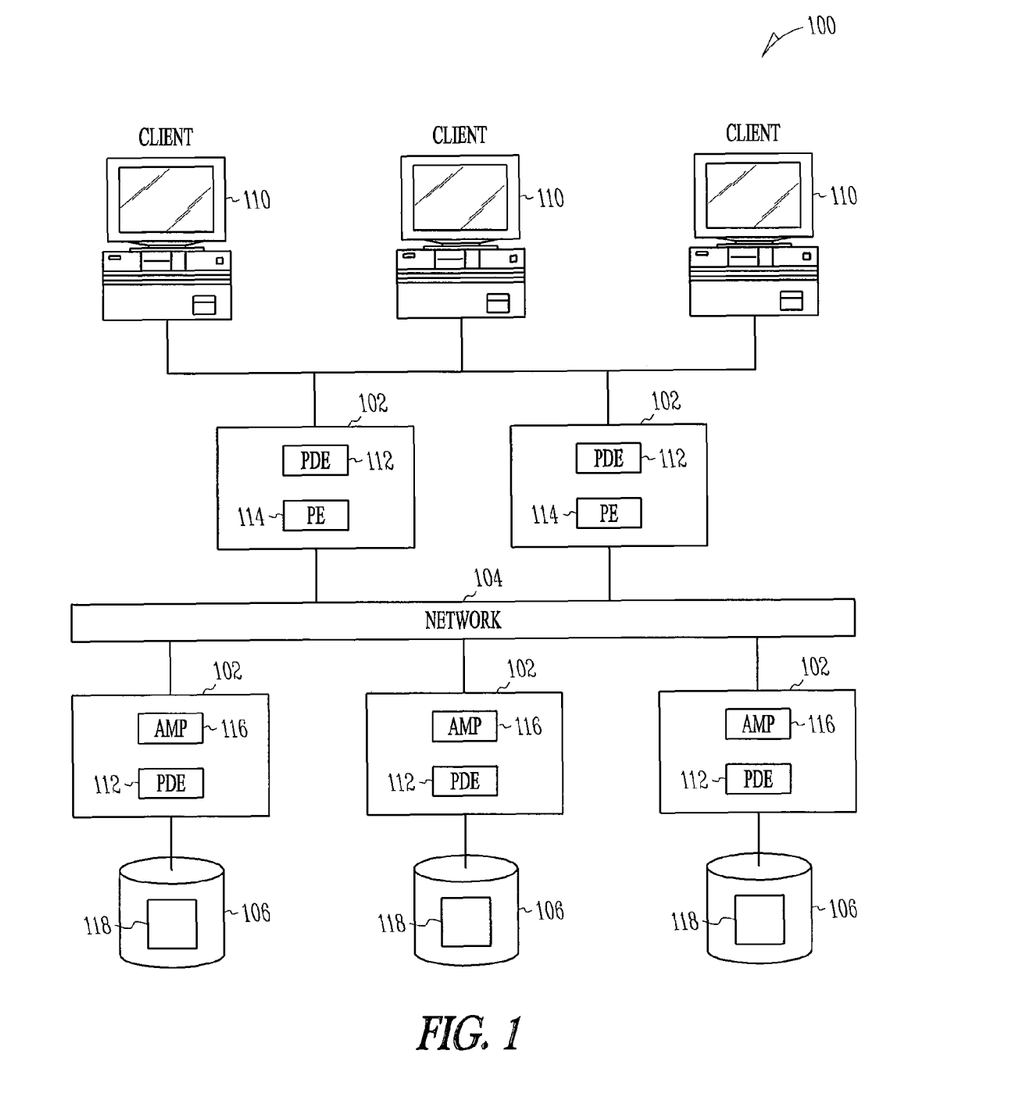
FIG. 1 is a block diagram of a hardware an software environment for implementing methods according to an example embodiment.

FIG. 1 illustrates an example hardware and software environment that may be used to implement the join index maintenance and partial covering methods. A computer system 100 may be comprised of one or more processing units (PUs) 102, also known as processors or nodes, which may be interconnected by a network 104. Each of the PUs 102 may be coupled to zero or more fixed and/or removable data storage units (DSUs) 106, such as disk drives, that store one or more relational databases. Further, each of the PUs 102 may be coupled to zero or more data communications units (DCUs) 108, such as network interfaces, that communicate with one or more remote systems or devices.

Operators of the computer system 100 typically use a workstation 110, terminal, computer, handheld wireless device or other input device to interact with the computer system 100. This interaction generally comprises queries that conform to a Structured Query Language (SQL) standard, and invoke functions performed by a Relational Database Management System (RDBMS) executed by the system 100. In further embodiments, the computer system 100 may implement on-line analysis processing (OLAP) or multidimensional OLAP (MOLAP) or relational OLAP (ROLAP). Various other processing systems may also be implemented by computer system 100 or other computer systems capable of providing access to relational databases.

In one embodiment, the RDBMS comprises the Teradata® product offered by NCR Corporation, and may include one or more Parallel Database Extensions (PDEs) 112, Parsing Engines (PEs) 114, and Access Module Processors (AMPs) 116. These components of the RDBMS perform the function which enable of RDBMS and SQL standards, i.e., definition, compilation, interpretation, optimization, database access control, database retrieval, and database update.

Work may be divided among the PUs 102 in the system 100 by spreading the storage of a partitioned relational database 118 managed by the RDBMS across multiple AMPs 116 and the DSUs 106 (which are managed by the AMPs 116). Thus, a DSU 106 may store only a subset of rows that comprise a table in the partitioned database 118 and work is managed by the system 100 so that the task of operating on each subset of rows is performed by the AMP 116 managing the DSUs 106 that store the subset of rows.

The PEs 114 handle communications, session control, optimization and query plan generation and control. The PEs 114 fully parallelize all functions among the AMPs 116. As a result, the system of FIG. 1 applies a multiple instruction stream, multiple data stream (MIMD) concurrent processing architecture to implement a relational database management system 100.

Both the PEs 114 and AMPs 116 are known as "virtual processors" or "vprocs". The vproc concept is accomplished by executing multiple threads or processes in a PU 102, wherein each thread or process is encapsulated within a vproc. The vproc concept adds a level of abstraction between the multi-threading of a work unit and the physical layout of the parallel processing computer system 100. Moreover, when a PU 102 itself is comprised of a plurality of processors or nodes, the vproc concept provides for intra-node as well as the inter-node parallelism.

The vproc concept results in better system 100 availability without undue programming overhead. The vprocs also provide a degree of location transparency, in that vprocs communicate with each other using addresses that are vproc-specific, rather than node-specific. Further, vprocs facilitate redundancy by providing a level of isolation/abstraction between the physical node 102 and the thread or process. The result is increased system 100 utilization and fault tolerance.

In various embodiments, data partitioning and repartitioning may be performed, in order to enhance parallel processing across multiple AMPs 116. For example, the data may be hash partitioned, range partitioned, or not partitioned at all (i.e., locally processed). Hash partitioning is a partitioning scheme in which a predefined hash function and map is used to assign records to AMPs 116, wherein the hashing function generates a hash "bucket" number and the hash bucket numbers are mapped to AMPs 116. Range partitioning is a partitioning scheme in which each AMP 116 manages the records falling within a range of values, wherein the entire data set is divided into as many ranges as there are AMPs 116. No partitioning means that a single AMP 116 manages all of the records.

Generally, the PDEs 112, PEs 114, and AMPs 116 are tangibly embodied in and/or accessible from a device, media, carrier, or signal, such as RAM, ROM, one or more of the DSUs 106, and/or a remote system or device communicating with the computer system 100 via one or more of the DCUs 108. The PDEs 112, PEs 114, and AMPs 116 each comprise logic and/or data which, when executed, invoked, and/or interpreted by the PUs 102 of the computer system 100, cause the methods or elements of the present invention to be performed.

As noted above, many different hardware and software environments may be used to implement the methods described herein. A spectrum of embodiments ranging from stand alone processors with a single storage device, to multiple distributed processors with distributed storage devices storing one or more databases may be used in various embodiments.

Horizontal Partial Covering Method

Figure 2:
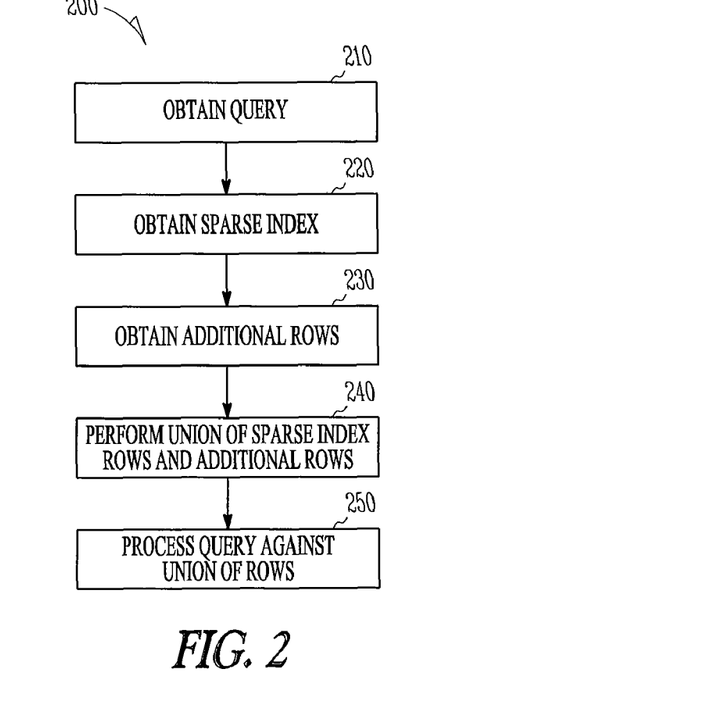
FIG. 2 is a flowchart illustrating a method of obtaining a complete row set for a query according to an example embodiment.

In FIG. 2, a computer implemented method 200 includes obtaining a query referring to rows in a relational database at 210. A sparse index of the database that has a set of rows that is a subset of the rows referred to in the query is obtained at 220. At 230, rows referred to in the query that are not in the sparse index are obtained. A union of such rows and the rows of the sparse index is performed at 240 to obtain a complete row set for processing the query. In one embodiment, the query may be processed against the union of rows at 250.

Figure 3:
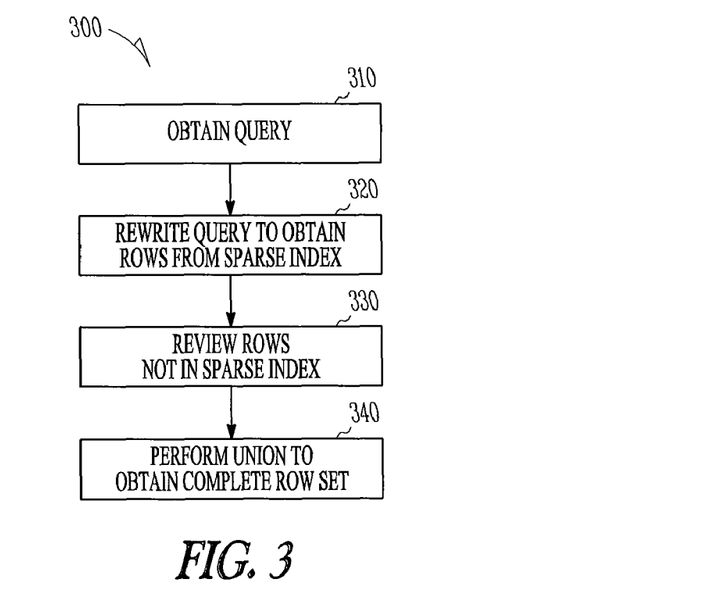
FIG. 3 is a flowchart illustrating a method of rewriting a query to provide query results according to an example embodiment.

In a further embodiment as illustrated in FIG. 3, a computer implemented method 300 is performed to rewrite a query to provide query results in a more efficient manner. The query is first obtained at 310 and refers to rows in a relational database. At 320, the query is rewritten to select rows from a sparse index. At 330, rows that are not in the sparse index are retrieved and at 340 a union of such rows and the rows of the sparse index is performed to obtain a complete row set for processing the query.

In one example embodiment, base tables are defined with a partitioned primary index (PPI) by which new incoming data go to the most recent partition(s) as described in the following database definition language (DDL) statements:

```
CREATE SET TABLE orders
  (
  o_orderkey INTEGER NOT NULL,
  o_orderdate DATE FORMAT 'yyyy-mm-dd' NOT NULL,
  o_ amount integer)
PRIMARY INDEX ( o_orderkey )
PARTITION BY RANGE_N(o_orderdate BETWEEN DATE '1998-01-01'
AND DATE '2004-12-31' EACH INTERVAL '1' MONTH );
```

The last two lines correspond to a very specific example. In further embodiments, the statements may be represented generically as:

PARTITION BY RANGE_N(o_orderdate BETWEEN DATE 'xxx'
AND DATE 'yyy' EACH INTERVAL 'zzz' QQQ)
wherein xxx and yyy are dates, and zzz is a number of time periods QQQ. As indicated above, the dates are in one specific format, but may be in other formats as desired. While a MONTH is indicated as the time period above, the time period may be varied to correspond to an actual application, such as a day, week, year, quarter, hour, minute, or whatever other type of time period desired.

A join index may be defined with the sparse condition that specifies a "snapshot view" of the data. When the base table is updated, the join index (JI) maintenance may be bypassed as a result of the values of the updated rows being outside the range set by the sparse condition.

CREATE JOIN INDEX orders_ji AS
SEL o_orderkey, o_orderdate, o_amount
FROM orders
WHERE o_orderdate BETWEEN DATE '2003-01-01' AND
  DATE '2004-10-31'
PRIMARY INDEX (o_orderkey)
PARTITION BY range_n(o_orderdate BETWEEN DATE
  '1998-01-01'
AND DATE '2004-10-31' EACH INTERVAL '1' MONTH);
EXPLAIN INS INTO orders (100, '2004-11-01', 1000);

1) First, perform an INSERT into HONG.orders.
→No rows are returned to the user as the result of statement 1.

EXPLAIN DEL orders WHERE o_orderdate<'2003-01-01';

1) First, lock a distinct HONG."pseudo table" for write on a RowHash to prevent global deadlock for HONG.orders.
2) Next, lock HONG.orders for write.
3) Perform an all-AMPs DELETE from 60 partitions of HONG.orders with a condition of ("HONG.orders.o_orderdate<DATE '2003-01-01'").
4) Finally, send out an END TRANSACTION step to all AMPs involved in processing the request.

No rows are returned to the user as the result of statement 1.

This "snapshot ji" can be used to answer queries that ask for more rows than those included in the JI. For example, the following query SEL *
FROM orders
WHERE o_orderdate BETWEEN DATE '2002-01-01' AND DATE '2004-12-31';

can be rewritten as:

SEL *
FROM
(SEL *
FROM orders_ji
WHERE ji_ret_cond
UNION ALL
SEL *
FROM orders
WHERE base_ret_cond)DT;

Assume that the sparse condition in the JI definition and the query condition are sparse_ji_cond and query_cond, respectively. The ji_ret_cond, which represents the condition used for the join index retrieval, is calculated as:

ji_ret_cond=query_cond AND sparse_ji_cond

Since all the rows in the join index already satisfy the sparse_ji_cond, the expression can be simplified as:

ji_ret_cond=query_cond

Furthermore, when

!query_cond AND sparse_ji_cond=false;

i.e. the row set of the query result is a superset of the row set included in the join index, ji_ret_cond may be set to be true because all the rows in the join index are needed to answer the query. In the above example, query_cond=o_orderdate BETWEEN DATE '2002-01-01' AND DATE '2004-12-31';
sparse_ji_cond=o_orderdate BETWEEN DATE '2003-01-01' AND DATE '2004-10-31';

Since

! query_cond AND sparse_ji_cond = (o_orderdate < '2002-01-01' OR
                                   o_orderdate > '2004-12-31') AND
                                  (o_orderdate >= '2003-01-01' AND
                                   o_orderdate <= '2004-10-31')
                                = (o_orderdate < '2002-01-01' AND
                                   o_orderdate >= '2003-01-01' AND
                                   o_orderdate <= '2004-10-31') OR
                                  (o_orderdate > '2004-12-31' AND
                                   o_orderdate >= '2003-01-01' AND
                                   o_orderdate <= '2004-10-31')
                                = false Therefore, ji_ret_cond=true in this example.

The base_ret_cond, which represents the condition for the retrieval from the base table to get the extra rows needed in the query, is calculated as:

base_ret_cond=query_cond AND !sparse_ji_cond

Since query_cond AND !sparse_ji_cond = (o_orderdate >= '2002-01-01' AND
                                  o_orderdate <= '2004-12-31') AND
                                 (o_orderdate < '2003-01-01' OR
                                  o_orderdate > '2004-10-31')
                               = (o_orderdate >= '2002-01-01' AND
                                  o_orderdate <= '2004-12-31') AND
                                  o_orderdate < '2003-01-01' OR
                                 (o_orderdate >= '2002-01-01' AND
                                  o_orderdate <= '2004-12-31' AND
                                  o_orderdate > '2004-10-31')
                               = (o_orderdate >= '2002-01-01' AND
                                  o_orderdate < '2003-01-01') OR
                                 (o_orderdate > '2004-10-31' AND
                                  o_orderdate <= '2004-12-31')

Therefore base_ret_cond specifies two range conditions that correspond to the rows that are required in the query but are not included in the join index.

The above example illustrates the idea of the "horizontal partial covering"—when the row set in JI is a subset of that required by the query, a retrieval to the base table for the rest of rows is needed and the union of the two can give the row set required in the query.

Figure 4:
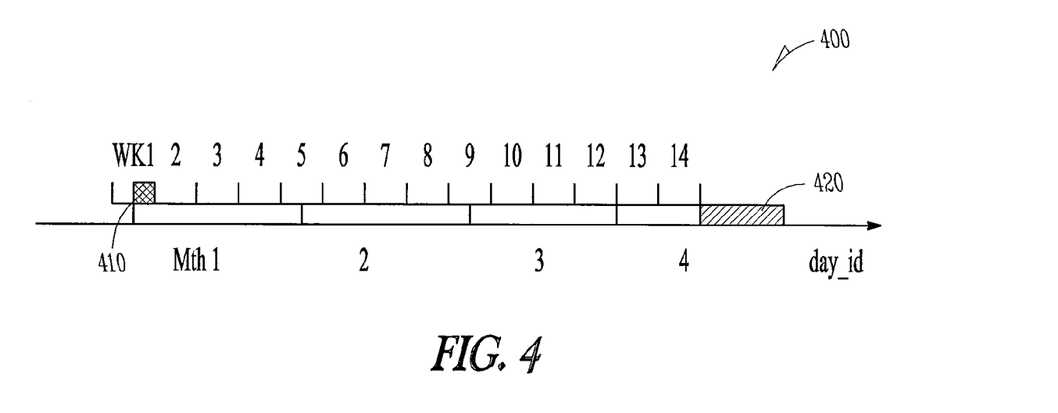
FIG. 4 illustrates a join index time line that partially covers a query range according to an example embodiment.

In the following, an example is described where using the horizontal partial covering method can help to improve performance by leveraging an aggregate join index (AJI) with aggregates at the same or lower level than that is required in the query. Assume a fact table and a dimension table as:
Sales (store_id, day_id, prod_id, amount);
Calendar (day_id, wk, mth, qtr, yr) unique index(day_id);

An AJI at week level is defined as:
CREATE JOIN INDEX AJI_wk AS
SEL wk, mth, SUM(amount) AS wktotalsales
FROM sales, calendar
WHERE sales.day_id = calender.day_id AND
  wk BETWEEN startweek AND endweek
GROUP BY wk, mth PRIMARY INDEX (wk)
PARTITION BY RANGE_N(wk BETWEEN startweek
AND endweek EACH INTERVAL '1' WEEK);
    A query that rolls up to the month level,
SEL mth, SUM(amount)
FROM sales, calendar
WHERE    sales.day_id=calender.day_id    AND    mth
    BETWEEN startmonth AND endmonth;
can be answered by the following rewritten query:
SEL mth, SUM (mthtotalsales)
FROM
    (SEL mth, SUM(wktotalsales) AS mthtotalsales
    FROM AJI_wk
    WHERE mth BETWEEN startmonth AND endmonth
    GROUP BY mth
    UNION ALL
    SEL mth, SUM(amount) AS mthtotalsales
    FROM sales, calendar
    WHERE sales.day_id=calender.day_id and
        (mth>=startmonth    and    mth<=endmonth    and
          wk<startweek) OR
        (mth>=startmonth    and    mth<=endmonth    and
          wk>endweek)
    GROUsP BY mth) DT (month, mthtotalsales)
GROUP BY mth;

The time ranges covered in the join index (from startweek to endweek) and in the query (from startmonth to endmonth) may be different. So going back to the base table to get the missing rows in the join index may be needed in order to use the AJI to answer the query. A time line 400 in FIG. 4 illustrates that the join index time line covers the query range on the left side but falls short on the right. A portion of data in the first week that are in the startmonth are indicated at 410. Rows that are not included in the join index but required in the query are indicated at 420. By adding the query condition to the join index retrieval, the portion of data in the $1^{st}$ week corresponding to the startmonth in the query is selected. This can be done because mth is included in the join index's grouping key. On the other hand, those rows that satisfy the base_ret_cond are fetched from the Calendar table, joined with the Sales table and rolled up to the month level. Note that a final SUM step is added on top of the UNION. The final SUM step is used because there can be overlapping rows returned from the two retrievals. For example, in the time line shown in the diagram, both the roll-ups from the $13^{th}$ and $14^{th}$ week in the join index and the rows fetched from the base table correspond to the endmonth. One final aggregate is added to merge the subtotals for the same grouping key.

Maintaining Join Index

In an ADW environment, to avoid maintaining the join index at real time when the base table is frequently updated, users can define a "snapshot join index" by using the sparse condition in the join index definition. For example, for an orders table as previously defined and a join index defined with a range sparse condition doesn't need to be maintained when the values of the o_orderdate column in the updated rows are outside the range set by the previously defined condition.

As more data are loaded into and/or purged from the base table, the join index evolves accordingly. Otherwise, the "snapshot join index" may miss a large portion of data that are included in the base table so that the snapshot join index no longer helps to answer the query efficiently.

A syntax can be used to modify the database definition language (DDL) of a join index when a new scope of data needs to be defined for the "snapshot". There is no need to drop the join index and recreate one with the new definition, in which case the whole join index table is recalculated. The new sparse condition may be compared in the new DDL with the old one. An incremental part may be found between the two. The JI rows may be calculated from the rows in the base table that satisfy the delta condition, and the JI table may be updated.

The new syntax may be designed as follows:
ALTER JOIN INDEX ji_name CHANGE FROM
WHERE old_sparse condition
TO
WHERE new_sparse condition;

The syntax specifies the new sparse condition while all the other elements of the join index definition, such as select list, joins, grouping keys etc., remain the same.

By using this new join index DDL, users have the control of when to update the join index table. Users may choose a batch window to run the update that minimizes the impact to other activities in the ADW. Users may also choose the extent to which they would like to bring the join index up-to-date. The more data that are updated, the bigger the batch window and the less frequent the update is needed.

Figure 5:
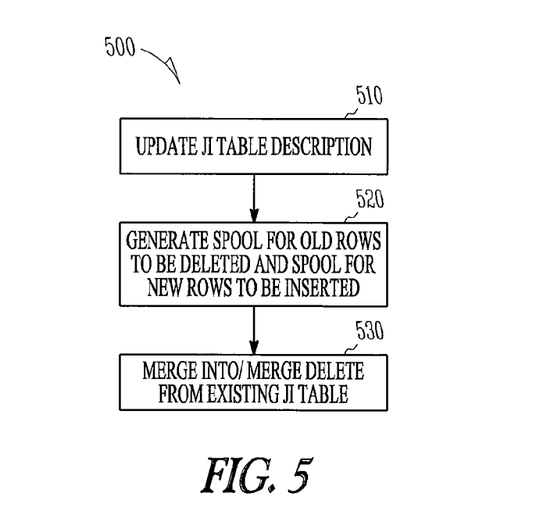
FIG. 5 is a flowchart illustrating a method of deferring join index updates according to an example embodiment.

In one embodiment, the execution process of the above JI DDL is illustrated in FIG. 5 at 500. At 510, the table description of JI is updated. At 520, spools that contain the old rows to be deleted and the new rows to be inserted, respectively are generated. The spools are then merged into/merge deleted from the existing join index table at 530.

Generation of the spools at 520 may be performed in different manners. In one embodiment, spools are generated for a single table join index. The same order table example as above is used to illustrate such generation. If it is desired to expand orders_ji to include the most recent two months' data. A new DDL of doing so is:
ALTER JOIN INDEX orders_ji CHANGE FROM
WHERE o_orderdate BETWEEN DATE '2003-01-01' AND
    DATE '2004-10-31'
TO
WHERE o_orderdate BETWEEN DATE '2003-01-01' AND
    DATE '2004-12-31';

Then the query used to generate the spool that contains the new rows for the JI should be:
SEL o_orderkey, o_orderdate, o_amount
FROM orders
WHERE    o_orderdate>'2004-10-31'    AND    o_orderdate<='2004-12-31';

The syntax is designed in a broad sense that it can be used both to expand JI to include new data and to purge old data that are no longer needed in JI. Therefore in general, two spools will be generated. The WHERE clause condition used to generate the one for deleting the old rows is:

! new_sparse condition AND old_sparse condition

And the WHERE clause condition used to generate the one for adding the new rows is:

new_sparse condition AND !old_sparse condition

For a multiple table join index, an assumption is made that a fact table and a dimension table are defined as:
Sales (store_id, day_id, prod_id, amount);
Calendar (day_id, wk, mth, qtr, yr) unique index(day_id);
An AJI at week level is defined as:
CREATE JOIN INDEX AJI_wk AS
SEL wk, mth, SUM(amount) AS wktotalsales
FROM sales, calendar
WHERE sales.day_id=calender.day_id AND
    wk BETWEEN startweek AND endweek
GROUP BY wk, mth
PRIMARY INDEX (wk)

PARTITION BY RANGE_N(wk BETWEEN startweek AND endweek EACH INTERVAL '1' WEEK);

The time range included in this AJI may be changed by issuing the following DDL command:

ALTER JOIN INDEX AJI_wk CHANGE FROM
WHERE wk BETWEEN startweek AND endweek
TO
WHERE wk BETWEEN new_startweek AND new_endweek Depending on the relationship between the new and old startweek/endweek, there are different scenarios of changing the AJI:
  (i) new_startweek>startweek: purging old historical data from JI;
  (ii) new_startweek<startweek: expanding JI to include more historical data;
  (iii) new_endweek>endweek: expanding JI to include more recent data;
  (iv) new_endweek<endweek: purging recent data from JI.

Considering the workload in an ADW, scenarios (i) and (iii) are the most useful ones. SQL statements may be used to generate the two spools under such conditions (new_startweek>startweek and new_endweek>endweek):
(a) Spool that contains the rows to be deleted from the AJI:
  SEL wk, mth, SUM(amount) AS wktotalsales
  FROM sales, calendar
  WHERE sales.day_id=calender.day_id AND
    sales.day_id BETWEEN $1^{st}$ day of startweek AND ($1^{st}$ day of new_startweek-1)
  GROUP BY wk, mth;
(b) Spool that contains the rows to be inserted into the AJI:
  SEL wk, mth, SUM(amount) AS wktotalsales
  FROM sales, calendar
  WHERE sales.day_id = calender.day_id AND
    sales.day_id BETWEEN (Last day of endweek+1) AND Last day of new_endweek
  GROUP BY wk, mth;

When the base table is partitioned on day_id, the retrieval from the sales table is very efficient as the partition elimination is applied to get only those partitions involved in the incremental parts. Also if the join index table is partitioned on wk, the operations of merge delete from and merge into the join index table can benefit from the clustering of the data rows on one or more data blocks that are to be written.

To some extent, the new syntax is similar to

ALTER TABLE table_name ADD/DROP RANGE BETWEEN ...;

When such a DDL is issued to a base table, the new partitions corresponding to the ADD RANGE expression are added and old partitions corresponding to the DROP RANGE expression are dropped. The new syntax for altering join index DDLs is designed to achieve the same goal of supporting data evolutions in an ADW environment but with the following different aspects:
  (1) The ALTER JOIN INDEX syntax is more general. It supports both PPI and non-PPI join indexes and any partition expressions in PPI JI;
  (2) DROP RANGE may not be allowed on a join index when the range is not empty. Otherwise, data in the join index may be out of sync with the base table. By changing the sparse condition of the join index, the data in the join index may be manipulated to tailor it for the query requirements. The sparse condition in the join index lets it to be frozen at a certain time frame without being updated frequently along with the base table therefore the maintenance cost of the join index can be reduced significantly. Then changing the sparse condition brings the join index data up-to-date to whatever data freshness requirement that is needed.
  (3) The underlying maintenance process of the join index table for the ALTER JOIN INDEX DDL can be every efficient when there are proper PPIs defined for the base table and the join index so that the "snapshot join index" can be brought up-to-date in a small time window.

Figure 6:
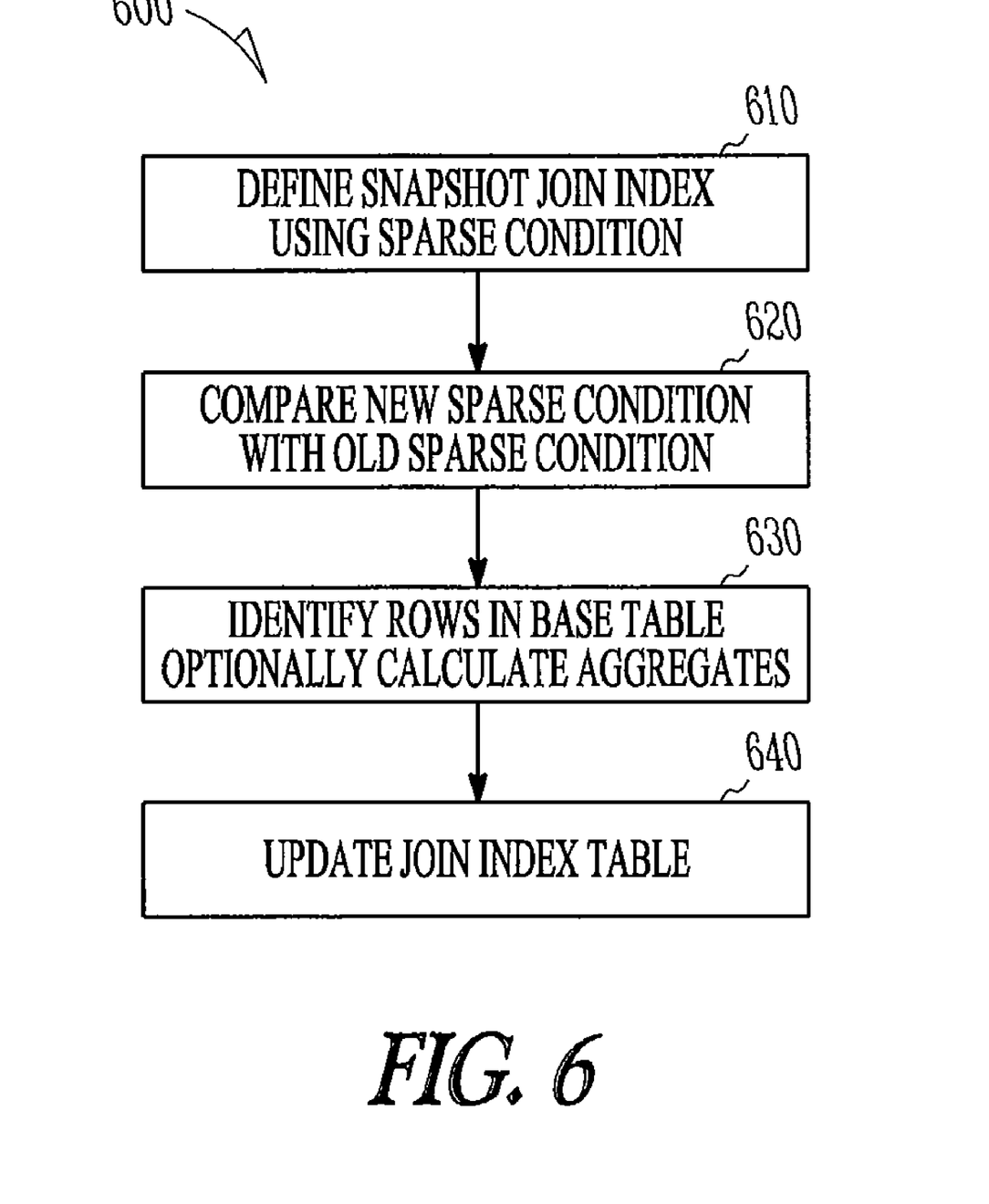
FIG. 6 is a flowchart describing a method of updating a join index according to an example embodiment.

FIG. 6 is a flowchart describing a method of updating a join index table generally at 600. At 610, a snapshot join index is defined using a sparse condition in a join index definition. A new sparse condition of the snapshot join index is compared with an old sparse condition at 620. At 630, rows are identified in a base table as a function of the comparing and then the join index table is updated at 640. In one embodiment, the join index table is an aggregate join index table and identifying rows 630 further includes calculating aggregates.

Conclusion

A new DDL syntax may be used to change the sparse condition in a join index enabling users to have the control of when to bring the join index up to date and what range of data to include in the join index. When the join index definition is altered, the differences between the old and new data sets are calculated and two spools are generated to merge delete from/merge into the join index table. It provides a way to emulate the performance of the deferred maintenance in some RDBMS systems while guarantees 100% accurate query results.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A method comprising:
  defining a snapshot join index from a join index table using a sparse condition in a join index definition;
  comparing a new sparse condition of the snapshot join index with an old sparse condition, wherein the comparing identifies an incremental delta condition between the new sparse condition and the old sparse condition;
  identifying rows in a base table as a function of the comparing; and
  updating rows in the join index table as a function of the identified rows in the base table.

2. The method of claim 1 wherein updating is performed in a selected batch window to minimize impact to other activities in a data warehouse that provides the snapshot join index.

3. The method of claim 1 wherein the join index table is an aggregate join index table.

4. The method of claim 3 wherein identifying rows further comprises calculating aggregates.

5. The method of claim 1 wherein a syntax for defining the new sparse condition comprises:
  ALTER JOIN INDEX ji_name CHANGE FROM
  WHERE old_sparse condition
  TO
  WHERE new_sparse condition.

6. The method of claim 1 wherein identifying rows in a base table comprises generating spools that contain old rows to be deleted and new rows to be inserted.

7. The method of claim 6 wherein updating the join index table comprises updating using the rows identified in the spools to merge delete from/merge into the join index table.

8. The method of claim 1 wherein the join index table comprises multiple tables.

9. The method of claim 8 wherein the join index is changed by one or more of:
   purging old historical data from the join index;
   expanding the join index to include more historical data;
   expanding the join index to include more recent data; and
   purging recent data from the join index.

10. A tangible non-transitory computer readable medium having instructions stored thereon to cause a computer to implement a method comprising:
   defining a snapshot join index from a join index table using a sparse condition in a join index definition;
   comparing a new sparse condition of the snapshot join index with an old sparse condition, wherein the comparing identifies an incremental delta condition between the new sparse condition and the old sparse condition;
   identifying rows in a base table as a function of the comparing; and
   updating rows in the join index table as a function of the identified rows in the base table.

11. The computer readable medium of claim 10 wherein updating is performed in a selected batch window to minimize impact to other activities in a data warehouse that provides the snapshot join index.

12. The computer readable medium of claim 10 wherein the join index table is an aggregate join index table.

13. The computer readable medium of claim 12 wherein identifying rows further comprises calculating aggregates.

14. The computer readable medium of claim 10 wherein a syntax for defining the new sparse condition comprises:
   ALTER JOIN INDEX ji_name CHANGE FROM
   WHERE old_sparse condition
   TO
   WHERE new_sparse condition.

15. The computer readable medium of claim 10 wherein identifying rows in a base table comprises generating spools that contain old rows to be deleted and new rows to be inserted, and wherein updating the join index table comprises updating using the rows identified in the spools to merge delete from/merge into the join index table.

16. The computer readable medium of claim 10 wherein the join index table comprises multiple tables, wherein the join index is changed by one or more of:
   purging old historical data from the join index;
   expanding the join index to include more historical data;
   expanding the join index to include more recent data; and
   purging recent data from the join index.

17. A system comprising:
   one or more processing units;
   one or more data storage units coupled to the one or more processors;
   one or more optimizers executing on the one or more processing units that are configured to:
      define a snapshot join index from a join index table using a sparse condition in a join index definition;
      compare a new sparse condition of the snapshot join index with an old sparse condition, wherein the comparing identifies an incremental delta condition between the new sparse condition and the old sparse condition;
      identify rows in a base table as a function of the compare; and
      update rows in the join index table as a function of the identified rows in the base table.

18. The system of claim 17 wherein the join index table is an aggregate join index table and wherein identifying rows further comprises calculating aggregates.

19. The system of claim 17 wherein a syntax for defining the new sparse condition comprises:
   ALTER JOIN INDEX ji_name CHANGE FROM
   WHERE old_sparse condition
   TO
   WHERE new_sparse condition.

20. The system of claim 17 wherein identifying rows in a base table comprises generating spools that contain old rows to be deleted and new rows to be inserted, and wherein updating the join index table comprises updating using the rows identified in the spools to merge delete from/merge into the join index table.

21. The system of claim 17 wherein the join index table comprises multiple tables, wherein the join index is changed by one or more of:
   purging old historical data from the join index;
   expanding the join index to include more historical data;
   expanding the join index to include more recent data; and
   purging recent data from the join index.

* * * * *